(12) United States Patent
Li et al.

(10) Patent No.: US 12,382,344 B2
(45) Date of Patent: Aug. 5, 2025

(54) METHODS AND APPARATUS FOR ESTABLISHING A SIDELINK RADIO BEARER

(71) Applicant: HUAWEI TECHNOLOGIES CO., LTD., Guangdong (CN)

(72) Inventors: Xiangyu Li, Shanghai (CN); Jing Liu, Shanghai (CN); Xiao Xiao, Shenzhen (CN); Jun Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1014 days.

(21) Appl. No.: 17/345,883

(22) Filed: Jun. 11, 2021

(65) Prior Publication Data
US 2021/0306913 A1    Sep. 30, 2021

Related U.S. Application Data

(63) Continuation of application No. PCT/CN2019/085267, filed on Apr. 30, 2019.

(30) Foreign Application Priority Data

Dec. 14, 2018    (CN) .......................... 201811537229.3

(51) Int. Cl.
*H04W 28/24*    (2009.01)
*H04W 4/40*    (2018.01)
(Continued)

(52) U.S. Cl.
CPC ............. *H04W 28/24* (2013.01); *H04W 4/40* (2018.02); *H04W 8/28* (2013.01); *H04W 72/21* (2023.01);
(Continued)

(58) Field of Classification Search
CPC ......... H04W 28/24; H04W 4/40; H04W 8/28; H04W 76/11; H04W 76/36; H04W 76/23;
(Continued)

(56) References Cited

U.S. PATENT DOCUMENTS

| | | | |
|---|---|---|---|
| 2017/0188404 A1* | 6/2017 | Fodor | .................. H04W 76/14 |
| 2018/0199312 A1 | 7/2018 | Wu et al. | |

(Continued)

FOREIGN PATENT DOCUMENTS

| | | |
|---|---|---|
| CN | 107295644 A | 10/2017 |
| CN | 107347215 A | 11/2017 |

(Continued)

OTHER PUBLICATIONS

English Translation of WO-2016161886-A1, 2016, Retrieved from PE2E Search on Jan. 7, 2025 (Year: 2016).*
(Continued)

*Primary Examiner* — Omar J Ghowrwal
(74) *Attorney, Agent, or Firm* — Fish & Richardson P.C.

(57) ABSTRACT

One example method includes sending, by a first terminal device, a first request message to a network device, where the first request message is used to request to establish a sidelink radio bearer (SL RB) between the first terminal device and a second terminal device, where the first request message includes at least one of a parameter index or at least one parameter. The first terminal device can then receive a first response message from the network device, where the first response message includes one or more of admission control indication information, the at least one parameter, the parameter index, or first SL RB radio resource configuration information, where the admission control indication information indicates that the network device allows establishment of the SL RB, and where the first SL RB radio resource configuration information includes at least one of (Continued)

an SL RB identifier or protocol layer configuration information.

16 Claims, 4 Drawing Sheets

(51) Int. Cl.
| | | |
|---|---|---|
| *H04W 8/28* | (2009.01) | |
| *H04W 72/21* | (2023.01) | |
| *H04W 72/23* | (2023.01) | |
| *H04W 72/25* | (2023.01) | |
| *H04W 72/40* | (2023.01) | |
| *H04W 72/543* | (2023.01) | |
| *H04W 76/11* | (2018.01) | |
| *H04W 76/14* | (2018.01) | |
| *H04W 76/30* | (2018.01) | |
| *H04W 76/36* | (2018.01) | |
| *H04W 4/44* | (2018.01) | |
| *H04W 4/46* | (2018.01) | |
| *H04W 76/23* | (2018.01) | |

(52) U.S. Cl.
CPC ........... *H04W 72/23* (2023.01); *H04W 72/25* (2023.01); *H04W 72/40* (2023.01); *H04W 72/543* (2023.01); *H04W 76/11* (2018.02); *H04W 76/14* (2018.02); *H04W 76/30* (2018.02); *H04W 76/36* (2018.02); *H04W 4/44* (2018.02); *H04W 4/46* (2018.02); *H04W 76/23* (2018.02)

(58) Field of Classification Search
CPC ..... H04W 76/14; H04W 72/25; H04W 72/21; H04W 72/23; H04W 72/40; H04W 72/543; H04W 76/30; H04W 4/44; H04W 4/46
See application file for complete search history.

(56) References Cited

U.S. PATENT DOCUMENTS

| | | | |
|---|---|---|---|
| 2020/0037132 A1* | 1/2020 | Wu | H04W 76/14 |
| 2020/0383100 A1* | 12/2020 | Yu | H04W 28/16 |

FOREIGN PATENT DOCUMENTS

| | | | | |
|---|---|---|---|---|
| CN | 108260105 A | 7/2018 | | |
| WO | 2015163624 A1 | 10/2015 | | |
| WO | WO-2016161886 A1 * | 10/2016 | ............ | H04W 76/10 |
| WO | 2017206168 A1 | 12/2017 | | |
| WO | 2018031816 A1 | 2/2018 | | |
| WO | 2018128372 A1 | 7/2018 | | |

OTHER PUBLICATIONS

3GPP TS 37.324 V15.1.0, "3rd Generation Partnership Project; Technical Specification Group Radio Access Network; E-UTRA and NR; Service Data Adaptation Protocol (SDAP) specification (Release 15)," Sep. 2018, 13 pages.
3GPP TS 38.331 V15.3.0 (Sep. 2018), "3rd Generation Partnership Project; Technical Specification Group Radio Access Network;NR-;Radio Resource Control (RRC) protocol specification(Release 15)," Sep. 2018, 445 pages.
3GPP TS 38.300 V15.3.1 (Oct. 2018), "3rd Generation Partnership Project; Technical Specification Group Radio Access Network;NR; NR and NG-RAN Overall Description;Stage 2(Release 15)," Oct. 2018, 92 pages.
Huawei, HiSilicon, "Radio bearer configuration and management for NR sidelink," 3GPP TSG-RAN WG2 Meeting #104, R2-1816522, Spokane, USA, Nov. 12-16, 2018, 5 pages.
PCT International Search Report and Written Opinion issued in International Application No. PCT/CN2019/085267 on Aug. 21, 2019, 17 pages (with English translation).
3GPP TS 36.300 V15.3.0 (Sep. 2018), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)," Sep. 2018, 358 pages.
Ericsson, "NR sidelink QoS handling," 3GPP TSG-RAN WG1 Meeting #94-Bis, R1-1811601, Chengdu, China, Oct. 8-12, 2018, 3 pages.
Extended European Search Report issued in European Application No. 19897259.8 on Dec. 16, 2021, 12 pages.
Huawei et al., "Potential RAN2 impacts on gNB scheduled resource allocation for NR V2X," 3GPP TSG-RAN WG2 #104, R2-1816518, Spokane, USA, Nov. 12-16, 2018, 5 pages.

* cited by examiner

METHODS AND APPARATUS FOR ESTABLISHING A SIDELINK RADIO BEARER

CROSS-REFERENCE TO RELATED APPLICATIONS

This application is a continuation of International Application No. PCT/CN2019/085267, filed on Apr. 30, 2019, which claims priority to Chinese Patent Application No. 201811537229.3, filed on Dec. 14, 2018. The disclosures of the aforementioned applications are hereby incorporated by reference in their entireties.

TECHNICAL FIELD

Embodiments of the present invention relate to the communications field, and in particular, to a sidelink communications method and apparatus.

BACKGROUND

On a PC5 interface of an evolved system vehicle to everything (long term evolution vehicle to everything, LTE V2X) communications system, a QoS facility is based on a granularity of a data packet, and each data packet from an application layer is associated with a proSe per packet priority (proSe per packet priority, PPPP) identifier, and optionally, is further associated with a proSe per packet reliability (proSe per packet reliability, PPPR) identifier. The PPPP identifier indicates a scheduling priority of the data packet, and the PPPR identifier indicates a reliability requirement of the data packet. The data packet on the PC5 interface can be transmitted only in a broadcast manner based on a corresponding destination layer 2 address (destination L2 ID). User equipment (user equipment, UE) at a transmit end may infer a corresponding delay requirement (Packet Delay Budget, PDB) based on a PPPP, and ensure data transmission reliability based on a PPPR by using a PDCP duplication operation. The UE determines a mapping relationship between a PPPP and a logical channel identifier (LCH ID), and a network configures a mapping relationship between a PPPP and a logical channel group (Logical Channel Group, LCG), so that the network learns of data volumes of different uplink services of the UE based on a BSR reported by the UE. The LCH ID is unique in one destination L2 ID. In other words, one logical channel is determined by both the destination L2 ID and the LCH ID.

Based on the foregoing description, UE at a receive end configures a sidelink radio bearer (sidelink radio bearer, SL RB) to meet a QoS requirement parameter, and there may be a problem that an SL RB configuration of the UE at the receive end does not match an SL RB configuration of the UE at the transmit end, resulting in low reliability of data transmission between the UE at the receive end and the UE at the transmit end.

SUMMARY

A technical problem to be resolved in this application is to provide a sidelink communications method and apparatus, thereby implementing a process in which a network device configures an SL RB, and ensuring that devices at two ends of the SL RB have a same SL RB configuration.

According to a first aspect, this application provides a sidelink communications method, including: A first terminal device sends a first request message to a network device. The first request message is used to request to establish an SL RB between the first terminal device and a second terminal device, the first request message includes a parameter index and/or at least one parameter, and the at least one parameter includes one or more of a QoS requirement parameter, an address of the second terminal device, an address of the first terminal device, identification information of a unicast connection, a communications type, and a logical channel identifier. The parameter index is an index of the at least one parameter, or the parameter index is an index of a combination of a respective value of the at least one parameter. The address of the first terminal device and the address of the second terminal device may be layer 2 addresses or other addresses delivered from an upper layer. The identification information of the unicast connection is information obtained through conversion based on the address of the first terminal device and the address of the second terminal device. The communications type may include broadcast, multicast, or unicast. The logical channel identifier is an identifier of a logical channel, in an idle state or a busy state, corresponding to the address of the second terminal device.

Optionally, the first terminal device receives a first response message from the network device. For example, the first response message includes one or more of admission control indication information, the at least one parameter, the parameter index, and first SL RB radio resource configuration information. For example, the admission control indication information indicates that the network device allows establishment of the SL RB, and the first SL RB radio resource configuration information includes an SL RB identifier and/or protocol layer configuration information. For example, the (at least one) parameter has an association relationship with the SL RB identifier, or the parameter index has an association relationship with the SL RB identifier. For another example, a plurality of values or a plurality of configurations corresponding to the parameter may be associated with a same SL RB identifier, or a plurality of parameter indexes may be associated with a same SL RB identifier.

Optionally, the SL RB identifier may further have an association relationship with the protocol layer configuration information.

Based on the foregoing description, a terminal device reports, to the network device, a group of parameters including the QoS requirement parameter and/or a parameter index of the group of parameters, and the network device configures the SL RB for the terminal device based on the group of parameters, so that an SL RB configuration is controlled by a network side, to avoid a problem that SL RB configurations of two terminals of the SL RB are different because only the terminal device configures the SL RB.

In a possible design, the at least one parameter may be a plurality of groups of parameters, each group of parameters corresponds to one parameter index, there may be one or more parameters in each group of parameters, and parameter values in the groups of parameters are different.

In a possible design, the parameter index is allocated by the first terminal device. When the first terminal device receives V2X service data (a V2X service data packet or a QoS flow) from the upper layer, the V2X service data packet is associated with at least one parameter. For example, a packet header of the V2X data packet carries the at least one parameter. The first terminal device allocates one parameter index to the at least one parameter.

In a possible design, the parameter index may be delivered from an upper layer of the first terminal device to an AS layer. For example, a V2X layer (for example, through inter-layer information exchange) of the first terminal device indicates, to the AS layer, a PC5 QFI (PC5 QoS flow indicator, PC5 QFI) associated with a V2X data packet. Alternatively, a PC5 QFI (PC5 QoS flow indicator, PC5 QFI) is carried in a packet header of the V2X data packet, to indicate the PC5 QoS flow identifier to which the V2X data packet belongs.

In a possible design, the address of the first terminal device and the address of the second terminal device are obtained by converting V2X service type identification information (PSID), a pair of the address of the first terminal device and the address of the second terminal device corresponds to one or more V2X service types, and one V2X service type corresponds to one group of QoS requirement parameters. The network device determines one piece of SL RB radio resource configuration information based on the address of the first terminal device and the address of the second terminal device in the first request message. The pair of the address of the first terminal device and the address of the second terminal device may be associated with a plurality of pieces of SL RB radio resource configuration information. Optionally, addresses of the first terminal device and addresses of the second terminal device in different pairs are associated with different SL RB radio resource configuration information. Optionally, addresses of the first terminal device and addresses of the second terminal device in different pairs may be associated with same SL RB radio resource configuration information.

In a possible design, the address of the first terminal device and the address of the second terminal device are address information that is delivered from the upper layer (for example, the V2X layer) of the first terminal to the AS layer and that is used to uniquely identify the terminal device. The network device determines the first SL RB radio resource configuration information based on the address of the first terminal device and the address of the second terminal device in the first request message. Optionally, a pair of the address of the first terminal device and the address of the second terminal device may be associated with a plurality of pieces of SL RB radio resource configuration information.

In a possible design, in the first terminal device, one piece of identification information of a unicast connection may be uniquely associated with a pair of the address of the first terminal device and the address of the second terminal device, and different identification information of unicast connections corresponds to different addresses of the first terminal device and different addresses of the second terminal device.

In a possible design, the method further includes: The first terminal device establishes the SL RB based on the first SL RB radio resource configuration information, and configures each protocol layer based on the protocol layer configuration information in the first SL RB radio resource configuration information, so that the SL RB meets the at least one parameter reported by the first terminal device.

In a possible design, the QoS requirement parameter includes one or more of a PC5 QoS flow identifier (PC5 QOS flow indicator, PC5 QFI), a PC5 interface 5th generation communications system quality of service identifier (PC5 5G QOS identifier, PQI), a vehicle-to-everything communications system quality of service identifier (V2X QoS identifier, VQI), a 5th generation communications system quality of service identifier (5G QOS identifier, 5QI), a guaranteed flow bit rate (guaranteed flow bit rate, GFBR), a maximum flow bit rate (maximum flow bit rate, MFBR), a minimum required communication range (minimum required communication range, range), and an allocation and retention priority (allocation and retention priority, ARP).

In a possible design, the protocol layer configuration information includes one or more of service data adaptation protocol (service data adaptation protocol, SDAP) layer configuration information, packet data convergence protocol (packet data convergence protocol, PDCP) layer configuration information, radio link control (radio link control, RLC) layer configuration information, LCH configuration information, media access control (media access control, MAC) layer configuration information, and physical (PHY) layer configuration information. In a possible design, the first response message may include notification status indication information, and the notification status indication information indicates whether the first SL RB radio resource configuration information is notified by the network device to the second terminal device. For example, the notification status indication information indicates that the first SL RB radio resource configuration information is not notified by the network device to the second terminal device. Alternatively, the notification status indication information indicates whether the first SL RB radio resource configuration information is notified by the first terminal device to the second terminal device. For example, the first terminal device needs to notify the second terminal device of the first SL RB radio resource configuration information. For example, the notification status indication information may be indicated by using a bit, and different values of the bit correspond to different notification statuses. For another example, whether the first response message carries the notification status indication information corresponds to different notification statuses.

In a possible design, when the notification status indication information indicates that the first SL RB radio resource configuration information is not notified by the network device to the second terminal device or the first SL RB radio resource configuration information needs to be notified by the first terminal device to the second terminal device, the first terminal device sends a second request message to the second terminal device. The second request message is used to request to establish the SL RB, and the second request message includes one or more of the address of the first terminal device, the address of the second terminal device, the first SL RB radio resource configuration information, and the at least one parameter. Optionally, the first SL RB radio resource configuration information has an association relationship with the at least one parameter. The first terminal device receives a second response message from the second terminal device. The second response message indicates that the second terminal device successfully establishes the SL RB.

In a possible design, the first response message may further include first timing duration. Optionally, the method further includes: When duration for which the first terminal device receives the V2X service data from the upper layer on the SL RB exceeds the first timing duration, the first terminal device releases a resource and a configuration that correspond to the SL RB. The first terminal device sends a third request message to the network device. The third request message is used to indicate the network device to release the resource and the configuration that correspond to the SL RB, and the third request message includes one or more of the following: the parameter index, the SL RB identifier, the address of the first terminal device, the address of the second terminal device, and the identification information of the unicast connection. The first terminal device sends a fourth request message to the second terminal device. The fourth request message is used to indicate the second terminal device to release the resource and the configuration that correspond to the SL RB, and the fourth request message includes one or more of the following: the address of the first terminal device, the address of the second terminal device, and the SL RB identifier.

In a possible design, the method may further include:

The first terminal device receives a fifth request message from the network device. The fifth request message is used to request to reconfigure the SL RB, and the fifth request message includes one or more of the address of the first terminal device, the identification information of the unicast connection, the address of the second terminal device, the parameter index, and second SL RB radio resource configuration information. The first terminal device reconfigures the SL RB based on the second SL RB radio resource configuration information.

In a possible design, the fifth request message may further include the notification status indication information, and the notification status indication information indicates whether the second SL RB radio resource configuration information is notified by the network device to the second terminal device, or whether the second SL RB radio resource configuration information is notified by the first terminal device to the second terminal device. For example, the notification status indication information in the fifth request message indicates that the second SL RB radio resource configuration information is not notified by the network device to the second terminal device or the first terminal device needs to notify the second terminal device of the second SL RB radio resource configuration information, and the first terminal device sends a sixth request message to the second terminal device.

In a possible design, based on an optional condition: when the notification status indication information indicates that the second SL RB radio resource configuration information is not notified by the network device to the second terminal device or is notified by the first terminal device to the second terminal device, the first terminal device may send a sixth request message to the second terminal device. The sixth request message is used to request the second terminal device to reconfigure the SL RB, and the sixth request message includes one or more of the address of the first terminal device, the address of the second terminal device, the second SL RB radio resource configuration information, and the at least one parameter. Optionally, the at least one parameter has an association relationship with the second SL RB radio resource configuration information.

In a possible design, the fifth request message may include second timing duration, and the first terminal device updates the current first timing duration based on the second timing duration.

In a possible design, the method may include: The first terminal device receives a seventh request message from the network device. The seventh request message is used to request to release the resource and the configuration that correspond to the SL RB. For example, the seventh request message includes any one or more of the following: the parameter index, the SL RB identifier, the address of the first terminal device, the address of the second terminal device, and the identification information of the unicast connection.

In a possible design, the method may include: The first terminal device sends a seventh response message to the network device. The seventh response message indicates that the first terminal device successfully releases the resource and the configuration that correspond to the SL RB.

In a possible design, the seventh request message may further include the notification status indication information. When the notification status indication information in the seventh request message indicates that the release of the resource and the configuration that correspond to the SL RB is not notified by the network device to the second terminal device or the first terminal device needs to notify the second terminal device of the release of the resource and the configuration that correspond to the SL RB, the first terminal device sends an eighth request message to the second terminal device.

In a possible design, the seventh request message may further include release status indication information, and the release status indication information indicates whether the network device indicates the second terminal device to release the resource and the configuration that correspond to the SL RB.

In a possible design, the release status indication information indicates that the network device does not indicate the second terminal device to release the resource and the configuration that correspond to the SL RB. The method may further include: The first terminal device sends the eighth request message to the second terminal device. The eighth request message includes one or more of the following: the address of the first terminal device, the address of the second terminal device, and the SL RB identifier.

According to a second aspect, this application provides a sidelink communications method, including: A network device receives a first request message from a first terminal device. The first request message is used to request to establish an SL RB between the first terminal device and a second terminal device, the first request message includes a parameter index and/or at least one parameter, the at least one parameter includes one or more of a QoS requirement parameter, an address of the first terminal device, an address of the second terminal device, identification information of a unicast connection, a communications type, and a logical channel identifier, and the parameter index is an index of the at least one parameter. The network device sends a first response message to the first terminal device. The first response message includes one or more of admission control information, the parameter index, and first SL RB radio resource configuration information, the admission control information indicates that the network device allows establishment of the SL RB, and the first SL RB radio resource configuration information includes an SL RB identifier and/or protocol layer configuration information.

For example, the (at least one) parameter has an association relationship with the SL RB identifier, or the parameter index has an association relationship with the SL RB identifier. For another example, a plurality of values or a plurality of configurations corresponding to the parameter may be associated with a same SL RB identifier, or a plurality of parameter indexes may be associated with a same SL RB identifier.

Optionally, the SL RB identifier may further have an association relationship with the protocol layer configuration information.

Based on the foregoing description, a terminal device reports, to the network device, a group of parameters including the QoS requirement parameter and/or a parameter index of the group of parameters, and the network device configures the SL RB for the terminal device based on the group of parameters, so that an SL RB configuration is controlled by a network side, to avoid a problem that SL RB configurations of two terminals of the SL RB are different because only the terminal device configures the SL RB.

In a possible design, the QoS requirement parameter includes one or more of a PC5 QFI, a PQI, a VQI, a 5QI, an ARP, a GFBR, an MFBR, and a range.

In a possible design, the protocol layer configuration information includes one or more of SDAP layer configuration information, PDCP layer configuration information, RLC layer configuration information, LCH configuration information, MAC layer configuration information, and PHY layer configuration information.

In a possible design, optionally, the first response message may include notification status indication information, and the notification status indication information indicates whether the first SL RB radio resource configuration information is notified by the network device to the second terminal device, or whether the first SL RB radio resource configuration information is notified by the first terminal device to the second terminal device.

In a possible design, the notification status indication information indicates that the first SL RB radio resource configuration information is notified by the network device to the second terminal device.

In a possible design, the method may further include: When the second terminal device is located within coverage of the network device, the network device sends a tenth request message to the second terminal device. The tenth request message is used to request the second terminal device to establish the SL RB. For example, the tenth request message includes one or more of the address of the first terminal device, the address of the second terminal device, the first SL RB radio resource configuration information, and the at least one parameter.

Optionally, the network device receives a tenth response message from the second terminal device.

In a possible design, the network device sends a fifth request message to the first terminal device. The fifth request message is used to reconfigure the SL RB, the fifth request message includes one or more of the address of the first terminal device, the identification information of the unicast connection, the address of the second terminal device, the parameter index, and second SL RB radio resource configuration information, and the second SL RB radio resource configuration information includes the SL RB identifier and/or the protocol layer configuration information.

In a possible design, the fifth request message may include the notification status indication information, and the notification status indication information indicates whether the second SL RB radio resource configuration information is notified by the network device to the second terminal device, or whether the second SL RB radio resource configuration information is notified by the first terminal device to the second terminal device.

In a possible design, the notification status indication information indicates that the second SL RB radio resource configuration information is notified by the network device to the second terminal device, or whether the second SL RB radio resource configuration information is notified by the first terminal device to the second terminal device.

In a possible design, the method may include: The network device sends an eleventh request message to the second terminal device. The eleventh request message includes one or more of the following: the address of the first terminal device, the address of the second terminal device, and the SL RB identifier.

In a possible design, the fifth request message may include second timing duration, and the second timing duration is used by the first terminal device to update currently configured first timing duration.

In a possible design, the method may include:
The network device sends a seventh request message to the first terminal device. The seventh request message is used to request to release a resource and a configuration that correspond to the SL RB.

In a possible design, the method may include: The network device receives a seventh response message from the first terminal device. The seventh response message indicates that the first terminal device successfully releases the resource and the configuration that correspond to the SL RB.

In a possible design, the first request message may include release status indication information, and the release status indication information indicates whether the network device indicates the second terminal device to release the resource and the configuration that correspond to the SL RB. For example, the release status indication information indicates that the network device indicates the second terminal device to release the resource and the configuration that correspond to the SL RB.

In a possible design, the method may further include: The network device sends a twelfth request message to the second terminal device. The twelfth request message includes one or more of the following: the address of the first terminal device, the address of the second terminal device, the parameter index, and the SL RB identifier.

According to a third aspect, this application provides a sidelink communications method. The method includes:
When actual QoS performance of an SL RB does not meet a QoS requirement parameter, a first terminal device sends a first request message to a network device. The first request message may be used to request to release a resource and a configuration that correspond to the SL RB. The first request message includes any one or more of the following: a parameter index, an SL RB identifier, an address of the first terminal device, an address of a second terminal device, and identification information of a unicast connection. The parameter index is an index of at least one parameter associated with the SL RB. The at least one parameter includes one or more of the QoS requirement parameter, the address of the first terminal device, the address of the second terminal device, the identification information of the unicast connection, a communications type, and a logical channel identifier.

The first terminal device sends a second request message to the second terminal device. The second request message is used to request to release the resource and the configuration that correspond to the SL RB. The second request message includes one or more of the following: the address of the first terminal device, the address of the second terminal device, and the SL RB identifier.

In a possible design, the QoS requirement parameter includes one or more of a PC5 QFI, a PQI, a VQI, a 5QI, an ARP, a GFBR, an MFBR, and a range.

According to a fourth aspect, this application provides a sidelink communications method, including:
When actual QoS performance of an SL RB does not meet a QoS requirement parameter, a first terminal device sends a first request message to a network device. The first request message is used to request the network device to reconfigure the SL RB. The first request message carries one or more of the following: the actual QoS performance, a parameter index, an SL RB identifier, an address of the first terminal device, an address of a second terminal device, and identification information of a unicast connection. For example, the parameter index is an index of at least one parameter associated with the SL RB, and the at least one parameter includes any one or more of the following: the QoS requirement parameter, the address of the first terminal device, the address of the second terminal device, the identification information of the unicast connection, a communications type, and a logical channel identifier. Optionally, first SL RB radio resource configuration information may be preconfigured for the SL RB, the first SL RB radio resource configuration information includes the SL RB identifier and protocol layer configuration information, and the SL RB is a radio bearer between the first terminal device and the second terminal device.

In a possible design, the method may include: The first terminal device receives a first response message from the network device. The first response message includes one or more of the following: acceptance status indication information, the parameter index, the at least one parameter, and second SL RB radio resource configuration information. For example, the modification status indication information indicates that the network device allows reconfiguration of the SL RB.

The first terminal device reconfigures the SL RB based on the second SL RB radio resource configuration information.

In a possible design, the first response message may include notification status indication information, and the notification status indication information indicates whether the second SL RB radio resource configuration information is notified by the network device to the second terminal device or whether the second SL RB radio resource configuration information is notified by the first terminal device to the second terminal device. For example, the notification status indication information may indicate that the second SL RB radio resource configuration information is not notified by the network device to the second terminal device, or may indicate whether the second SL RB radio resource configuration information is notified by the first terminal device to the second terminal device.

In a possible design, the method may further include:

The first terminal device sends a second request message to the second terminal device. The second request message includes one or more of the following: the address of the first terminal device, the address of the second terminal device, and the second SL RB radio resource configuration information.

In a possible design, the first response message may further include second timing duration, and the first terminal device updates current first timing duration based on the second timing duration.

According to a fifth aspect, this application provides a sidelink communications method. The method includes:

A network device receives a first request message from a first terminal device. The first request message is used to request the network device to reconfigure an SL RB. The first request message carries one or more of the following: actual QoS performance, a parameter index, an SL RB identifier, an address of the first terminal device, an address of a second terminal device, and identification information of a unicast connection. For example, the parameter index is an index of at least one parameter associated with the SL RB, and the at least one parameter includes one or more of the following: a QoS requirement parameter, the address of the first terminal device, the identification information of the unicast connection, the address of the second terminal device, a communications type, and a logical channel identifier. Optionally, first SL RB radio resource configuration information is preconfigured for the SL RB, and the first SL RB radio resource configuration information includes the SL RB identifier and protocol layer configuration information.

The network device sends a first response message to the first terminal device. The first response message includes one or more of the following: modification status indication information, the parameter index, and second SL RB radio resource configuration information. For example, the modification status indication information indicates that the network device allows reconfiguration of the SL RB.

In a possible design, the first response message may include notification status indication information, and the notification status indication information indicates whether the second SL RB radio resource configuration information is notified by the network device to the second terminal device, or the notification status indication information indicates whether the second SL RB radio resource configuration information is notified by the first terminal device to the second terminal device. For example, the notification status indication information indicates that the second SL RB radio resource configuration information is notified by the network device to the second terminal device.

In a possible design, the method may include:

The network device sends a third request message to the second terminal device. The third request message is used to request the second terminal device to reconfigure the SL RB. The second request message includes one or more of the following: the address of the first terminal device, the address of the second terminal device, the at least one parameter, and the second SL RB radio resource configuration information.

The network device receives a second response message from the second terminal device.

In a possible design, the first response message may include second timing duration, and the second timing duration is used by the first terminal device to reconfigure current first timing duration.

According to a sixth aspect, this application provides a sidelink communications apparatus, including:

a transceiver unit, configured to: when a processing unit determines that actual QoS performance of an SL RB does not meet a QoS requirement parameter, send a first request message to a network device, where for example, the first request message may be used to request to release a resource and a configuration that correspond to the SL RB, the first request message includes any one or more of the following: a parameter index, an SL RB identifier, an address of a first terminal device, and an address of a second terminal device, the parameter index may be an index of at least one parameter associated with the SL RB, and the at least one parameter includes one or more of the QoS requirement parameter, the address of the first terminal device, the address of the second terminal device, a communications type, identification information of a unicast connection, and a logical channel identifier.

The transceiver unit is further configured to send a second request message to the second terminal device. The second request message is used to request to release the resource and the configuration that correspond to the SL RB, and the second request message includes one or more of the following: the address of the first terminal device, the address of the second terminal device, and the SL RB identifier.

In a possible design, the QoS requirement parameter includes one or more of a PC5 QFI, a PQI, a VQI, a 5QI, an ARP, a GFBR, an MFBR, and a range.

According to a seventh aspect, this application provides a sidelink communications apparatus, including:

a transceiver unit, configured to: when a processing unit determines that actual QoS performance of an SL RB does not meet a QoS requirement parameter, send a first request message to a network device, where the first request message is used to request the network device to reconfigure the SL RB, the first request message carries one or more of the following: the actual QoS performance, a parameter index, an SL RB identifier, an address of a first terminal device, an address of a second terminal device, and identification information of a unicast connection, the parameter index is an index of at least one parameter associated with the SL RB, the at least one parameter includes one or more of the following: the QoS requirement parameter, the address of the first terminal device, the identification information of the unicast connection, the address of the second terminal device, a communications type, and a logical channel identifier, optionally, first SL RB radio resource configuration information is preconfigured for the SL RB, and the first SL RB radio resource configuration information includes the SL RB identifier and protocol layer configuration information.

The transceiver unit is further configured to receive a first response message from the network device. The first response message includes one or more of the following: acceptance status indication information, the parameter index, the at least one parameter, and second SL RB radio resource configuration information, and the modification status indication information indicates that the network device allows reconfiguration of the SL RB.

The processing unit is further configured to reconfigure the SL RB based on the second SL RB radio resource configuration information.

In a possible design, the first response message may include notification status indication information, and the notification status indication information indicates whether the second SL RB radio resource configuration information is notified by the network device to the second terminal device. For example, the notification status indication information may indicate that the second SL RB radio resource configuration information is not notified by the network device to the second terminal device, or the notification status indication information may indicate whether the second SL RB radio resource configuration information is notified by the first terminal device to the second terminal device.

In a possible design, the transceiver unit is configured to: send a second request message to the second terminal device, where the second request message includes the address of the first terminal device and/or the second SL RB radio resource configuration information.

In a possible design, the first response message may include second timing duration, and the first terminal device updates current first timing duration based on the second timing duration.

According to an eighth aspect, this application provides a sidelink communications apparatus, including:

a transceiver unit, configured to receive a first request message from a first terminal device, where the first request message is used to request the network device to reconfigure an SL RB, the first request message carries one or more of the following: actual QoS performance, a parameter index, an SL RB identifier, an address of the first terminal device, an address of a second terminal device, and identification information of a unicast connection, for example, the parameter index is an index of at least one parameter associated with the SL RB, for example, the at least one parameter includes any one or more of the following: a QoS requirement parameter, the address of the first terminal device, the address of the second terminal device, the identification information of the unicast connection, a communications type, and a logical channel identifier, optionally, first SL RB radio resource configuration information is preconfigured for the SL RB, and the first SL RB radio resource configuration information includes the SL RB identifier and protocol layer configuration information.

The transceiver unit is further configured to send a first response message to the first terminal device. The first response message includes modification status indication information, the parameter index, and second SL RB radio resource configuration information, and the modification status indication information indicates that the network device allows reconfiguration of the SL RB.

In a possible design, the first response message may include notification status indication information, and the notification status indication information indicates whether the second SL RB radio resource configuration information is notified by the network device to the second terminal device or whether the second SL RB radio resource configuration information is notified by the first terminal device to the second terminal device. For example, the notification status indication information may be used to indicate that the SL RB radio resource configuration information is notified by the network device to the second terminal device.

In a possible design, the transceiver unit is configured to:
send a third request message to the second terminal device, where the third request message is used to request the second terminal device to reconfigure the SL RB, and the second request message includes one or more of the following: the address of the first terminal device, the address of the second terminal device, the parameter index, the SL RB identifier, the identification information of the unicast connection, and the second SL RB radio resource configuration information; and
receive a second response message from the second terminal device.

In a possible design, the first response message may include second timing duration, and the second timing duration is used by the first terminal device to reconfigure current first timing duration.

According to another aspect, an embodiment of the present invention provides a sidelink communications apparatus (an apparatus for short), and the apparatus has a function of implementing behavior of the network device in the foregoing method examples. The apparatus may be the network device in the foregoing aspects, or may be a system on chip used in the foregoing network device. The apparatus may alternatively be a mobile communications base station. The function may be implemented by hardware, or may be implemented by hardware executing corresponding software. The hardware or the software includes one or more modules corresponding to the foregoing function.

In a possible design, a structure of the network device includes a processor and a transmitter. The processor is configured to support the network device in performing a corresponding function in the foregoing methods. The transmitter is configured to: support communication between the network device and a terminal device, and send information or an instruction in the foregoing methods to the terminal device. The network device may further include a memory. The memory is coupled to the processor, and the memory stores a program instruction and data that are necessary for a base station.

According to still another aspect, an embodiment of the present invention provides a sidelink communications apparatus (an apparatus for short), and the apparatus has a function of implementing behavior of the terminal device in the foregoing method designs. The apparatus may be the terminal device in the foregoing aspects, or may be a system on chip used in the foregoing terminal device. The apparatus may alternatively be a vehicle-mounted communications hardware module. The function may be implemented by hardware, or may be implemented by hardware executing corresponding software. The hardware or the software includes one or more modules corresponding to the foregoing function. The module may be software and/or hardware.

Still another aspect of this application provides a computer storage medium, including an instruction. When the instruction is run on a computer, the computer is enabled to perform the method in any one of the first aspect to the fifth aspect or the possible implementations of the first aspect to the fifth aspect.

Still another aspect of this application provides a computer program product including an instruction. When the computer program product runs on a computer, the computer is enabled to perform the method in any one of the first aspect to the fifth aspect or the possible implementations of the first aspect to the fifth aspect.

Still another aspect of this application provides a communications system. The system includes any one of the foregoing sidelink communications apparatuses used for a network device and/or any one of the foregoing sidelink communications apparatuses used for a terminal device.

DESCRIPTION OF EMBODIMENTS

Figure 1A:
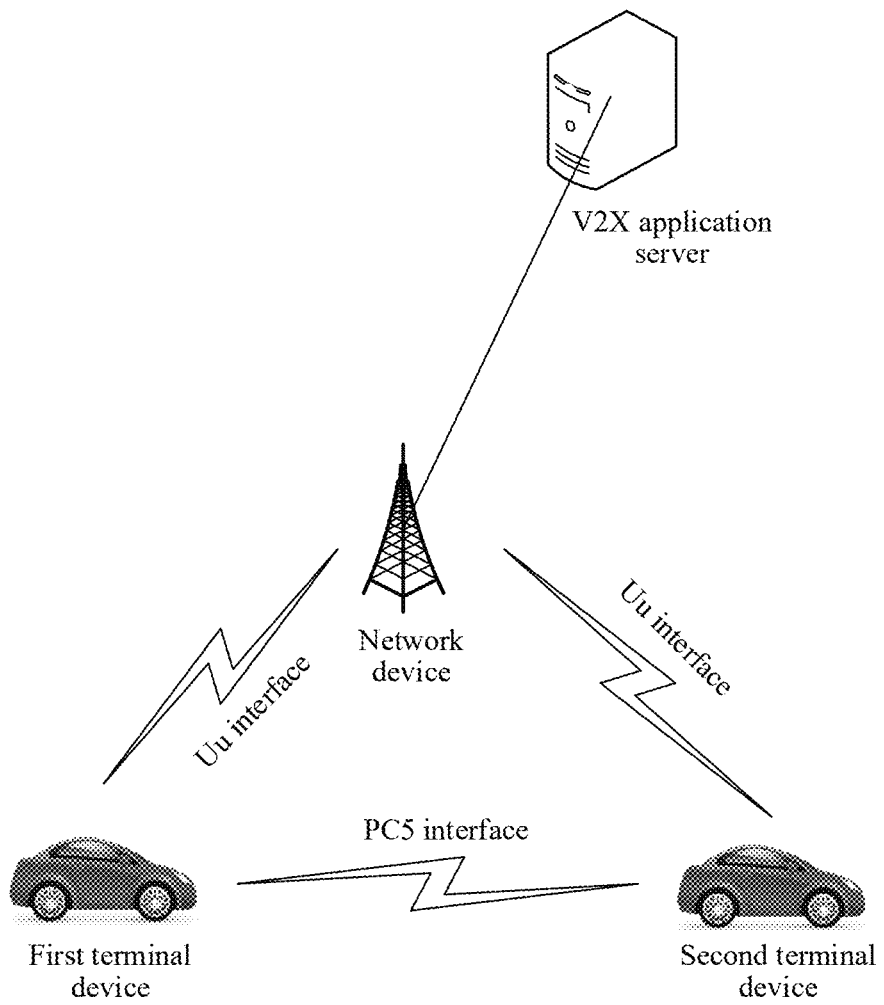
FIG. 1A is a schematic structural diagram of a vehicle-to-everything communications system according to an embodiment of the present invention.

FIG. 1A is a network architecture diagram of a vehicle-to-everything communications system according to an embodiment of the present invention. The vehicle-to-everything communications system includes a first terminal device, a vehicle-to-everything application server, a network device, and a second terminal device. The first terminal device and the network device communicate with each other through a Uu interface, the second terminal device and the network device also communicate with each other through a Uu interface, the first terminal device and the second terminal device communicate with each other through a PC5 interface, and a communications link between the first terminal device and the second terminal device is also referred to as a sidelink (sidelink, SL). In this embodiment of the present invention, the first terminal device and the second terminal device communicate with each other via the network device. To be specific, V2X service data transmitted between the first terminal device and the second terminal device reaches a peer end after being forwarded by the network device. For example, the first terminal device sends V2X service data to the second terminal device. The first terminal device sends the V2X service data to the network device through the Uu interface, then the network device sends the V2X service data to the V2X application server for processing, and the V2X application server sends processed V2X service data to the second terminal device via the network device. It should be noted that the network device via which the first terminal device sends the V2X service data and a network device via which the second terminal device receives V2X service data from an upper layer may be a same network device, or may be different network devices. A specific case is determined based on coverage of the network device. If the first terminal device and the second terminal device are within coverage of the same network device, the network device via which the first terminal device sends the V2X service data and the network device via which the second terminal device receives the V2X service data are the same network device; or if the first terminal device and the second terminal device are within coverage of the different network devices, the network device via which the first terminal device sends the V2X service data is different from the network device via which the second terminal device receives the V2X service data from the upper layer. In FIG. 1A, an example in which the network device via which the first terminal device sends the V2X service data and the network device via which the second terminal device receives the V2X service data from the upper layer are the same network device is used.

Figure 1B:
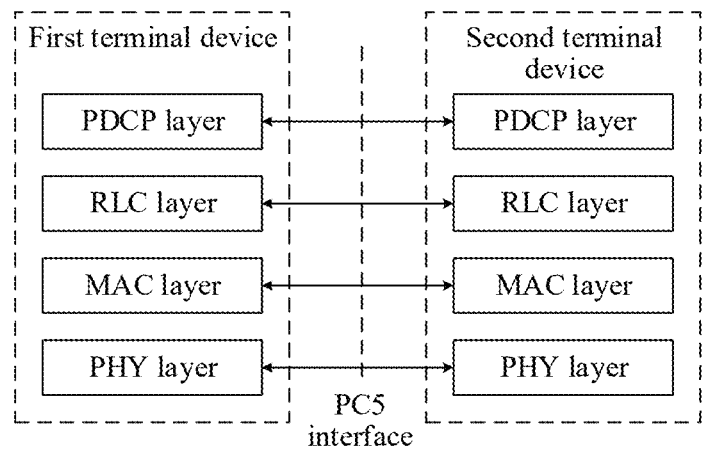
FIG. 1B is a schematic structural diagram of a protocol layer of a terminal device according to an embodiment of the present invention.

Referring to FIG. 1B, the first terminal device and the second terminal device each include a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical (PHY) layer. For a function of each layer, refer to descriptions of an existing LTE V2X protocol. Details are not described herein. When transmitting one MAC PDU at the PHY layer, the first terminal device and the second terminal device send sidelink control information and data, and the SCI indicates a time-frequency resource used for data transmission. A plurality of SL RBs may be established between the first terminal device and the second terminal device, each SL RB corresponds to one piece of SL RB radio resource configuration information, and the SL RB configuration information indicates a configuration of each of the foregoing protocol layers, for example, a PDCP SN length and an RLC UM mode.

The SL RB is an end-to-end radio bearer. When the SL RB is established, modified, or released, the SL RB needs to be established, modified, or released at both two ends corresponding to the SL RB. For example, for the first terminal device and the second terminal device, when the first terminal device and the second terminal device establish an SL RB, it is considered that the SL RB is successfully established between the first terminal device and the second terminal device only after the first terminal device performs an SL RB related configuration to establish the SL RB and the second terminal device performs an SL RB related configuration to establish the SL RB.

The first terminal device and the second terminal device are vehicle-to-everything terminals, and the vehicle-to-everything terminal is a terminal device deployed on a vehicle.

The network device in this application may also be referred to as a base station device, and is a device deployed in a radio access network to provide a wireless communication function. The network device includes but is not limited to a base station (for example, a BTS (base transceiver station, BTS), a NodeB (NodeB, NB), an evolved NodeB (evolutional NodeB, eNB or eNodeB), a transmission node or a transmission reception point (transmission reception point, TRP or TP) in an NR system, a next generation NodeB (generation NodeB, gNB), or a base station or a network device in a future communications network), a relay node, an access point, a vehicle-mounted device, a wearable device, a wireless fidelity (wireless-fidelity, Wi-Fi) station, a wireless backhaul node, a small cell, a micro base station, and the like.

Figure 2:
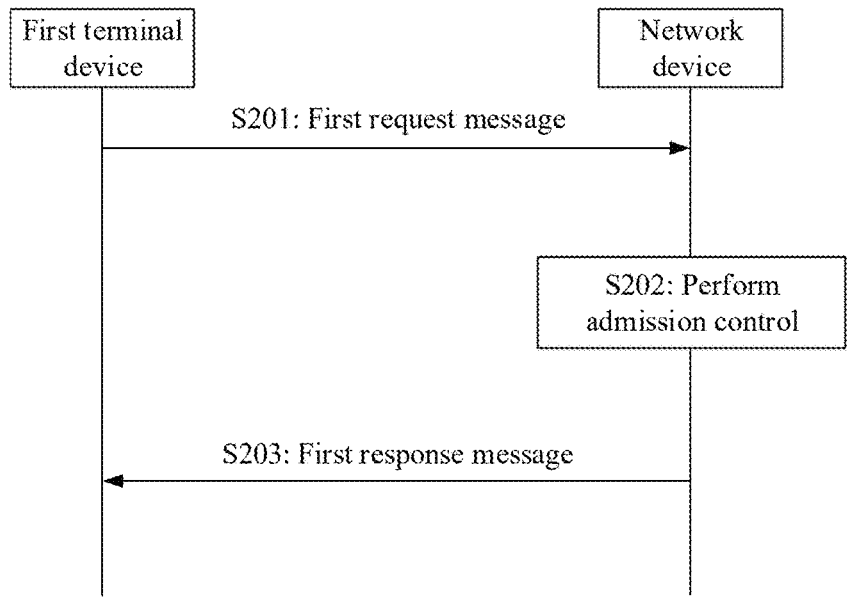
FIG. 2 is a schematic flowchart of a sidelink communications method according to an embodiment of the present invention.

FIG. 2 is a schematic flowchart of a sidelink communications method according to an embodiment of the present invention. In this embodiment of the present invention, the method includes the following steps.

S201: A first terminal device sends a first request message to a network device, and the network device receives the first request message from the first terminal device.

Specifically, the first request message is used to request to establish an SL RB between the first terminal device and a second terminal device. The first request message includes a parameter index and/or at least one parameter. The at least one parameter includes one or more of the following: a QoS requirement parameter, an address of the first terminal device, an address of the second terminal device, connection identification information (for example, identification information of a unicast connection), a communications type, and a logical channel identifier. The parameter index is an index of the at least one parameter. For example, a quantity of the at least one parameter may be one or more, and the parameter index has an association relationship with the at least one parameter.

The QoS requirement parameter indicates quality of service achieved by the SL RB. For example, the QoS requirement parameter may include one or more of a PC5 QFI, a PQI, a VQI, a 5QI, an ARP, a GFBR, an MFBR, and a range. For example, the address of the first terminal device and the address of the second terminal device may be destination layer 2 addresses, or may be other addresses delivered from an upper layer. The connection identification information may be information obtained through conversion based on the address of the first terminal device and the address of the second terminal device. The communications type indicates a communications mode used between the first terminal device and the second terminal device, and the communications type is one or more of broadcast, multicast, or unicast. The logical channel identifier indicates a logical channel, in an idle state, corresponding to the address of the second terminal device on a sidelink or a channel, in a busy state, corresponding to the address of the second terminal device on the sidelink, so that the network device learns of information about an allocable logical channel identifier corresponding to the address of the second terminal device, where the information is used to configure the SL RB.

In a possible implementation, the first terminal device receives V2X service data. The V2X service data includes a V2X service data packet or a QoS data flow (QOS flow), and the V2X service data is associated with the at least one parameter. For example, the V2X service data carries the at least one parameter. After obtaining the at least one parameter associated with the V2X service data, the first terminal device allocates one parameter index to the at least one parameter, and the parameter index is associated with the at least one parameter.

In a possible implementation, the first terminal device receives V2X service data. The V2X service data includes a V2X service data packet or a QoS data flow (QOS flow), and the V2X service data is associated with the parameter index. For example, the parameter index (PC5 QFI) may be carried in the V2X service data.

In a possible implementation, the at least one parameter may be classified into a plurality of groups, each group of parameters corresponds to one parameter index, there may be one or more parameters in each group of parameters, and the parameters in the groups are different.

In a possible design, the address of the first terminal device and the address of the second terminal device are obtained by converting V2X service type identification information (PSID), a pair of the address of the first terminal device and the address of the second terminal device corresponds to one or more V2X service types, and one V2X service type corresponds to one group of QoS requirement parameters. The network device determines first SL RB radio resource configuration information based on the address of the first terminal device and the address of the second terminal device in the first request message. The pair of the address of the first terminal device and the address of the second terminal device may be associated with a plurality of pieces of first SL RB radio resource configuration information.

An optional manner includes: associating different addresses of the first terminal device and different addresses of the second terminal device with different first SL RB radio resource configuration information.

An optional manner includes: associating different addresses of the first terminal device and different addresses of the second terminal device with same first SL RB radio resource configuration information.

In a possible design, the address of the first terminal device and the address of the second terminal device are address information that is delivered from the upper layer and that is used to uniquely identify a terminal device, the network device determines first SL RB radio resource configuration information based on the address of the first terminal device and the address of the second terminal device in the first request message, and a pair of the address of the first terminal device and the address of the second terminal device may be associated with a plurality of pieces of first SL RB radio resource configuration information.

In a possible design, in the first terminal device, one piece of connection identification information is uniquely associated with a pair of the address of the first terminal device and the address of the second terminal device, and different connection identification information corresponds to different addresses of the first terminal device and different addresses of the second terminal device. S202: The network device performs admission control.

Specifically, the network device determines, based on one or more of a current resource allocation status, link quality of the sidelink, and core network authorization information, whether the QoS requirement parameter is met. The resource allocation status includes one or more of a time-frequency resource, a codeword resource, and a port resource that are idle for the network device. The sidelink indicates a communications link between the first terminal device and the second terminal device. The link quality includes one or more of a delay, a jitter, a bandwidth, and a rate. The core network authorization information indicates whether QoS requirement information reported by the first terminal device is authorized by a core network. When a determining result is "yes", the network device allows establishment of the SL RB, and the network device generates the first SL RB radio resource configuration information of the SL RB based on the at least one parameter. The first SL RB radio resource configuration information includes an SL RB identifier and protocol layer configuration information, and the SL RB identifier indicates an identifier of the SL RB. The protocol layer configuration information includes one or more of SDAP layer configuration information, PDCP layer configuration information, RLC layer configuration information, LCH configuration information, MAC layer configuration information, and PHY layer configuration information.

An SDAP layer configuration may include one or more of the following information: at least one parameter mapped to the SL RB, the parameter index corresponding to the at least one parameter, and information indicating whether a default SL DRB configuration and SDAP layer packet header information (for example, a PC5 QFI identifier) are used.

A PDCP layer configuration may include one or more of the following information: a timer (discard timer) used to control a time for which one PDCP service data unit (service data unit, SDU) may be stored in a PDCP buffer; a timer (t-Reordering) used to wait for an out-of-order data packet in a reordering function; whether a PDCP layer can submit data packets to the upper layer out of order; whether SL data compression is used at the PDCP layer and there is a related configuration of the SL data compression (for example, a compression buffer size and a dictionary used for compression); a sequence number (sequence number, SN) length used for a PDU at the PDCP layer; a security configuration used by a PDCP entity, including whether encryption and/or integrity protection are/is performed; a security algorithm (an integrity protection algorithm and an encryption algorithm), a key, and/or the like used by the PDCP entity; whether a duplication (duplication) mechanism and a duplication configuration are used for a PDCP entity, where if the duplication mechanism is used, the PDCP entity corresponds to two or more RLC entities and LCHs, and the duplication mechanism herein means that the PDCP entity duplicates a PDCP PDU, and submits the duplicated PDCP PDU to the two or more associated RLC entities for processing and transmission; and a related configuration of a PDCP layer header compression algorithm, such as whether to use header compression.

An RLC configuration may include one or more of the following information: modes used by an RLC entity, for example, an acknowledged mode (acknowledge mode, AM), an unacknowledged mode (unacknowledge mode, UM), and a transparent mode (transparent mode, TM) mode.

Optionally, if an RLC entity at a transmit end is configured to use an AM mode, the RLC layer configuration may further include one or more of the following information: an SN length of a PDU at an RLC layer, a timer (t-PollRetransmit) for controlling initiation of poll (poll) retransmission, a parameter (pollPDU) for controlling initiation of poll after specific RLC PDUs are sent, a parameter (pollByte) for controlling initiation of poll after specific bytes of RLC PDUs are sent, and a maximum quantity of retransmissions (maxRetxThreshold) at the RLC layer. The poll (poll) means that an AM RLC entity at a transmit end indicates, by using a poll bit (poll bit) in a MAC PDU, an AM RLC entity at a receive end to feed back a status report. Optionally, if an RLC entity at a receive end is configured to use an AM mode, the RLC layer configuration may further include one or more of the following information: an SN length of a PDU at an RLC layer, a timer (t-Reassembly) for controlling the RLC layer to wait for segmentation, and a timer (t-StatusProhibit) for controlling the RLC layer to prevent frequent sending of a status report.

Optionally, if an RLC entity at a transmit end is configured to use a UM mode, the RLC layer configuration may further include the following: an SN length of a PDU at an RLC layer. Optionally, if an RLC entity at a receive end is configured to use a UM mode, the RLC layer configuration may further include: an SN length of a PDU at an RLC layer, and/or a timer (t-Reassembly) for controlling the RLC layer to wait for segmentation.

For example, an LCH configuration may include one or more of the following information: an LCH identifier, an identifier of a logical channel group to which an LCH belongs, a related parameter (a priority, a prioritized bit rate PBR, and token bucket size duration) for performing logical channel priority processing, information about a carrier that may be used to transmit data on the LCH, information about a resource configuration mode (a mode 1 or a mode 2, or a mode 1 and a mode 2) that may be used to transmit the data on the LCH, numerology information (for example, a subcarrier spacing, a cyclic prefix length, resource time domain duration, and whether a configured grant may be used) of a resource that may be used to transmit the data on the LCH, a parameter (SR-mask) for controlling whether the LCH can trigger an SR, and a parameter (SR-DelayTimerApplied) for controlling whether the LCH can delay triggering the SR.

S203: The network device sends a first response message to the first terminal device, and the first terminal device receives the first response message from the network device.

Specifically, the first response message includes one or more of admission control indication information, the at least one parameter, the first SL RB radio resource configuration information, and the parameter index. For example, the at least one parameter and/or the parameter index have/has an association relationship with the SL RB identifier, and a plurality of groups of at least one parameter and/or a plurality of parameter indexes may be associated with a same SL RB identifier. The SL RB identifier has an association relationship with the protocol layer configuration information. For example, the (at least one) parameter has an association relationship with the SL RB identifier, or the parameter index has an association relationship with the SL RB identifier. For another example, a plurality of values or a plurality of configurations corresponding to the parameter may be associated with a same SL RB identifier, or a plurality of parameter indexes may be associated with a same SL RB identifier.

For example, the admission control indication information in S203 indicates that the network device allows the establishment of the SL RB. The first terminal device determines, based on the parameter index, the at least one parameter associated with the SL RB. For example, the admission control indication information is indicated by using a bit. When the bit is 1, it indicates that the network device allows the establishment of the SL RB; or when the bit is 0, it indicates that the network device does not allow the establishment of the SL RB. For another example, when the first response message carries the admission control indication information, it indicates that the network device allows the establishment of the SL RB; or when the first response message does not carry the admission control indication information, it indicates that the network device does not allow the establishment of the SL RB.

For example, when a request message carries a parameter index, a response message corresponding to the request message also carries the parameter index, and does not carry at least one parameter; or when a request message does not carry a parameter index, a response message corresponding to the request message carries at least one parameter, and does not carry the parameter index.

For example, when the network device does not allow the establishment of the SL RB, the network device sends, to the first terminal device, a response message that carries a parameter index and admission control indication information. The admission control indication information in this case indicates that the network device does not allow the establishment of the SL RB.

In a possible implementation, when the first response message carries the first SL RB radio resource configuration information, it indicates that the network device allows the establishment of the SL RB; or when the first response message does not carry the first SL RB radio resource configuration information, it indicates that the network device does not allow the establishment of the SL RB, thereby reducing signaling overheads.

In a possible implementation, the first response message further includes notification status indication information, and the notification status indication information in the first response message indicates whether the first SL RB radio resource configuration information is notified by the network device to the second terminal device. For example, the notification status indication information is indicated by using a bit. When the bit is "0", it indicates that the first SL RB radio resource configuration information is not notified by the network device to the second terminal device; or when the bit is "1", it indicates that the first SL RB radio resource configuration information is notified by the network device to the second terminal device. For another example, when the first response message carries the notification status indication information, it indicates that the first SL RB radio resource configuration information is notified by the network device to the second terminal device; or when the first response message does not carry the notification status indication information, it indicates that the first SL RB radio resource configuration information is not notified by the network device to the second terminal device. Optionally, the first terminal device sends a second request message to the second terminal device. The second request message is used to request to establish the SL RB, and the second request message includes one or more of the address of the first terminal device, the address of the second terminal device, SL RB radio resource configuration information, and the at least one parameter. For example, the first SL RB radio resource configuration information has an association relationship with the at least one parameter. The second terminal device receives the second request message from the first terminal device, and the second terminal device establishes the SL RB based on the SL RB radio resource configuration information. After completing the establishment of the SL RB, the second terminal device sends a second response message to the first terminal device, and the second response message indicates that the second terminal device successfully establishes the SL RB.

In a possible implementation, when the network device determines, based on the address of the second terminal device, that the second terminal device is not within coverage of the network device, to be specific, a communications connection cannot be directly established between the network device and the second terminal device, a determining method may be as follows: The network device is previously configured with a terminal device list, where all terminal devices in the terminal device list are terminal devices within the coverage of the network device; the network device determines, based on the address of the second terminal device in the first request message, whether the address of the second terminal device is in the terminal device list; and if the address of the second terminal device is in the terminal device list, it indicates that the second terminal device is within the coverage of the network device; or if the address of the second terminal device is not in the terminal device list, the second terminal device is not within the coverage of the network device. When the second terminal device is not within the coverage of the network device, the first terminal device sends a second request message to the second terminal device. The second request message is used to request to establish the SL RB, and the second request message includes one or more of the address of the first terminal device, SL RB radio resource configuration information, the at least one parameter, and the parameter index. Optionally, the first SL RB radio resource configuration information has an association relationship with the at least one parameter. The second terminal device receives the second request message from the first terminal device, and the second terminal device establishes the SL RB based on the SL RB radio resource configuration information. After completing the establishment of the SL RB, the second terminal device sends a second response message to the first terminal device, and the second response message indicates that the second terminal successfully establishes the SL RB.

In a possible implementation, the first response message further includes a first timing duration. The method further includes:

When the first terminal device does not receive V2X service data on the SL RB within the first timing duration, the first terminal device releases the SL RB. The first timing duration may be set based on an actual requirement, and is not limited in this embodiment of the present invention.

The first terminal device sends a third request message to the network device. The third request message is used to indicate the network device to release a configuration and a resource that correspond to the SL RB, and the third request message includes one or more of the following: the parameter index, the SL RB identifier, the address of the first terminal device, the address of the second terminal device, and the identification information of the unicast connection.

The first terminal device sends a fourth request message to the second terminal device. The fourth request message is used to indicate the second terminal device to release the resource and the configuration that correspond to the SL RB, and the fourth request message includes one or more of the following: the address of the first terminal device, the address of the second terminal device, and the SL RB identifier.

In a possible implementation, the method further includes: The first terminal device receives a fifth request message from the network device. The fifth request message is used to request to reconfigure the SL RB, and the fifth request message includes one or more of the address of the first terminal device, the identification information of the unicast connection, the address of the second terminal device, the parameter index, and second SL RB radio resource configuration information. The first terminal device reconfigures the SL RB based on the second SL RB configuration information. The parameter index is the same as the parameter index in the first request message.

In a possible implementation, the fifth request message may include notification status indication information, the notification status indication information indicates whether the second SL RB radio resource configuration information is notified by the network device to the second terminal device or whether the first terminal device notifies the second terminal device of the second SL RB radio resource configuration information, and the notification status indication information may be indicated in an explicit or implicit manner. For example, the notification status indication information is indicated by using a bit. When the bit is 1, it indicates that the second SL RB radio resource configuration information is notified by the network device to the second terminal device; or when the bit is 0, it indicates that the second SL RB radio resource configuration information is not notified by the network device to the second terminal device. For another example, when the fifth request message carries the notification status indication information, it indicates that the second SL RB radio resource configuration information is notified by the network device to the second terminal device; or when the fifth request message does not carry the notification status indication information, it indicates that the second SL RB radio resource configuration information is not notified by the network device to the second terminal device.

In a possible implementation, when the notification status indication information in the fifth request message indicates that the second SL RB radio resource configuration information is not notified by the network device to the second terminal device, the first terminal device sends a sixth request message to the second terminal device. The sixth request message is used to request the second terminal device to reconfigure the SL RB, and the sixth request message includes one or more of the address of the first terminal device, the address of the second terminal device, and the second SL RB radio resource configuration information.

In a possible implementation, the fifth request message may further include second timing duration, the second timing duration is timing duration reconfigured by the network device for the SL RB, and the first terminal device updates the current first timing duration based on the second timing duration.

In a possible implementation, the first terminal device receives a seventh request message from the network device, and the seventh request message is used to request to release the resource and the configuration of the SL RB. The first terminal device releases the resource and the configuration that correspond to the SL RB.

In a possible implementation, the first terminal device sends a seventh response message to the network device, and the seventh response message indicates that the first terminal device successfully releases the resource and the configuration that correspond to the SL RB.

In a possible implementation, the fifth request message further includes release status indication information, and the release status indication information indicates whether the network device indicates the second terminal device to release the resource and the configuration that correspond to the SL RB. The release status indication information in the fifth request message indicates that the network device does not indicate the second terminal device to release the resource and the configuration that correspond to the SL RB. The release status indication information may be indicated in an explicit or implicit manner, for example, indicated by using different values of the bit, or indicated in a manner of whether the fifth request message carries the release status indication information.

In a possible implementation, the release status indication information indicates that the network device does not indicate the second terminal device to release the resource and the configuration that correspond to the SL RB. The method further includes: The first terminal device sends an eighth request message to the second terminal device. The ninth request message is used to request to release the resource and the configuration of the SL RB, and the eighth request message includes one or more of the following: the address of the first terminal device, the address of the second terminal device, and the SL RB identifier.

In a possible implementation, the notification status indication information in the first response message indicates that the first SL RB radio resource configuration information is notified by the network device to the second terminal device. Optionally, the method includes: When the second terminal device is within the coverage of the network device, the network device sends a ninth request message to the second terminal device. The ninth request message includes one or more of the address of the first terminal device, the address of the second terminal device, the first SL RB radio resource configuration information, and the at least one parameter. For example, the address of the first terminal device and the address of the second terminal device may be layer 2 addresses.

In a possible implementation, the notification status indication information in the fifth request message indicates that the second SL RB radio resource configuration information is notified by the network device to the second terminal device. Optionally, the method may include: The network device sends a tenth request message to the second terminal device. The tenth request message includes one or more of the following: the at least one parameter, the address of the first terminal device, the address of the second terminal device, and the second SL RB radio resource configuration information.

In a possible implementation, the release status indication information in the seventh request message indicates that the network device indicates the second terminal device to release the resource and the configuration that correspond to the SL RB.

The method further includes: The network device sends an eleventh request message to the second terminal device. The eleventh request message is used to request to release the resource and the configuration that correspond to the SL RB, and the eleventh request message includes one or more of the following: the address of the first terminal device, the address of the second terminal device, the identification information of the unicast connection, and the SL RB identifier.

Based on the description in FIG. 2, the terminal device reports, to the network device, a group of parameters including the QoS requirement parameter and/or a parameter index of the group of parameters, and the network device configures the SL RB for the terminal device based on the group of parameters, so that an SL RB configuration is controlled by a network side, to avoid a problem that SL RB configurations of two terminals of the SL RB are different because only the terminal device configures the SL RB.

Figure 3:
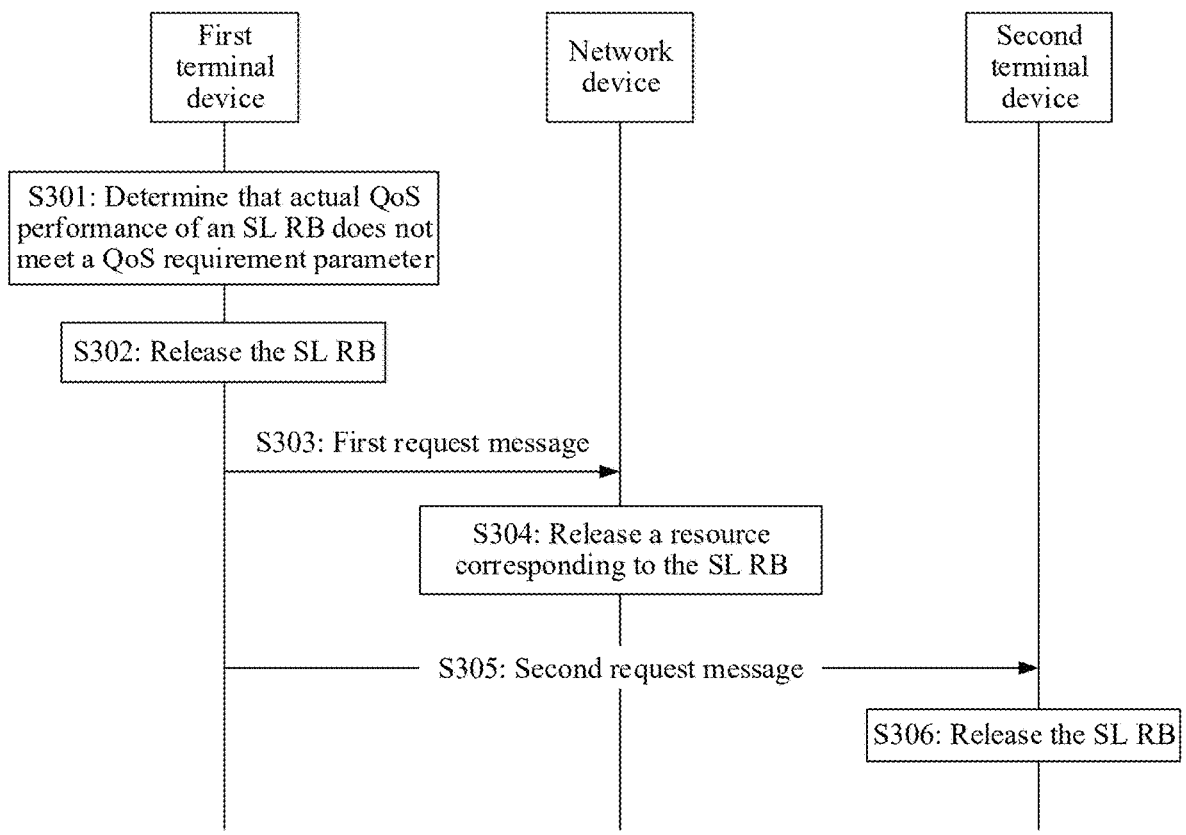
FIG. 3 is another schematic flowchart of a sidelink communications method according to an embodiment of the present invention.

FIG. 3 is another schematic flowchart of a sidelink communications method according to an embodiment of the present invention. In this embodiment of the present invention, the method includes the following steps.

S301: A first terminal device determines that an actual performance parameter of an SL RB does not meet a QoS requirement parameter.

Specifically, the SL RB is established between the first terminal device and a second terminal device. For a method for establishing the SL RB, refer to the descriptions in FIG. 2 to FIG. 4. Details are not described herein again. Actual QoS performance of the SL RB is monitored. QoS performance includes one or more of a delay, reliability, and a rate. A device for monitoring the actual QoS performance of the SL RB may be the first terminal device, or may be the second terminal device or another terminal device. The SL RB is associated with at least one parameter, and the at least one parameter includes one or more of the QoS requirement parameter, an address of the first terminal device, an address of the second terminal device, identification information of a unicast connection, and a communications type. The SL RB corresponds to one piece of SL RB radio resource configuration information, the SL RB radio resource configuration information includes an SL RB identifier and protocol layer configuration information, and the SL RB identifier indicates an identifier of the SL RB. The QoS requirement parameter includes one or more of a fifth generation mobile communications system quality of service standard PC5 QFI, a PQI, a VQI, a 5QI, an ARP, a GFBR, an MFBR, and a range. The protocol layer configuration information includes one or more of SDAP layer configuration information, PDCP layer configuration information, RLC layer configuration information, LCH configuration information, MAC layer configuration information, and PHY layer configuration information.

It should be noted that, when a request message carries a parameter index, a response message corresponding to the request message also carries the parameter index, and does not carry at least one parameter; or when a request message does not carry a parameter index, a response message corresponding to the request message carries at least one parameter, and does not carry the parameter index.

S302: The first terminal device performs an operation of releasing the SL RB.

Specifically, when determining that the SL RB meets a release condition, the first terminal device cancels an association relationship between the at least one parameter and the SL RB, and releases a resource of the SL RB.

S303: The first terminal device sends a first request message to a network device, and the network device receives the first request message from the first terminal device.

Specifically, the first request message is used to request the network device to release the resource corresponding to the SL RB, and the first request message includes one or more of the following: the parameter index, the SL RB identifier, the address of the first terminal device, the address of the second terminal device, and the identification information of the unicast connection.

S304: The network device releases the resource corresponding to the SL RB.

S305: The first terminal device sends a second request message to the second terminal device, and the second terminal device receives the second request message from the first terminal device.

Specifically, the second request message is used to request the second terminal device to release the SL RB, and the second request message includes one or more of the following: the address of the first terminal device, the address of the second terminal device, and the SL RB identifier.

S306: The second terminal device performs an operation of releasing the SL RB.

Based on the description in FIG. 7, when the actual QoS performance of the SL RB does not meet the QoS requirement parameter, the terminal devices release the resource and a configuration that correspond to the SL RB, to improve transmission quality of service data.

Figure 4:
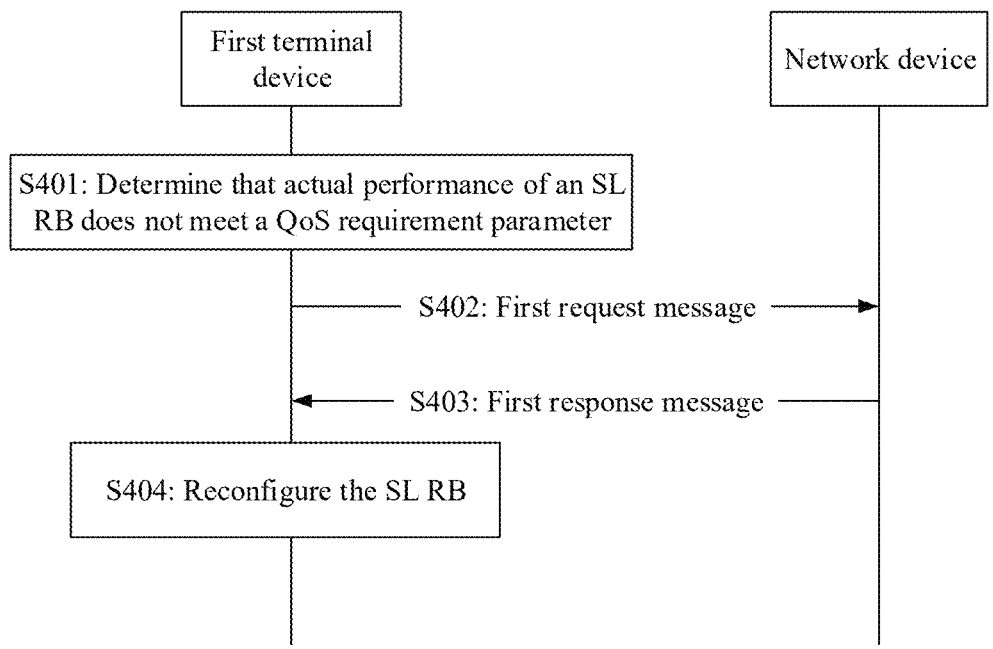
FIG. 4 is another schematic flowchart of a sidelink communications method according to an embodiment of the present invention.
Figure 5:
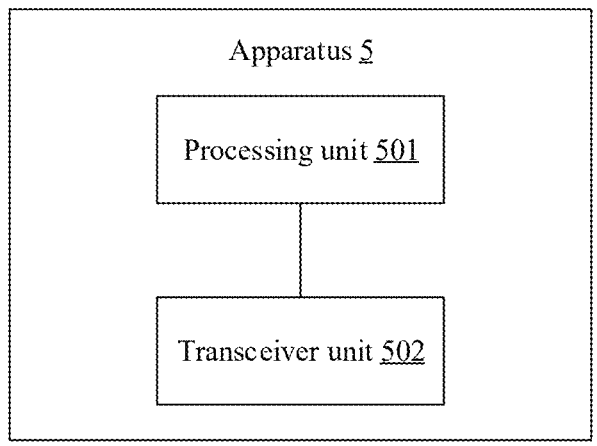
FIG. 5 is a schematic structural diagram of an apparatus according to an embodiment of the present invention.

FIG. 4 is still another schematic flowchart of a sidelink communications method according to an embodiment of the present invention. In this embodiment of the present invention, the method includes the following steps.

S401: A first terminal device determines that actual performance of an SL RB does not meet a QoS requirement parameter.

Specifically, the SL RB is established between the first terminal device and a second terminal device. For a method for establishing the SL RB, refer to the descriptions in FIG. 2 to FIG. 4. Details are not described herein again. The actual QoS performance of the SL RB is monitored. QoS performance includes one or more of a delay, reliability, and a rate. A device for monitoring the actual QoS performance of the SL RB may be the first terminal device, or may be the second terminal device or another terminal device. The SL RB is associated with at least one parameter, and the at least one parameter includes one or more of the QoS requirement parameter, an address of the first terminal device, an address of the second terminal device, identification information of a unicast connection, and a communications type. For example, first SL RB radio resource configuration information is preconfigured for the SL RB, the first SL RB radio resource configuration information includes an SL RB identifier and protocol layer configuration information, and the SL RB identifier indicates an identifier of the SL RB. The QOS requirement parameter includes one or more of a PC5 QFI, a PQI, a VQI, a 5QI, an ARP, a GFBR, an MFBR, and a range. The protocol layer configuration information includes one or more of SDAP layer configuration information, PDCP layer configuration information, RLC layer configuration information, LCH configuration information, MAC layer configuration information, and PHY layer configuration information.

It should be noted that, when a request message carries a parameter index, a response message corresponding to the request message also carries the parameter index, and does not carry at least one parameter; or when a request message does not carry a parameter index, a response message corresponding to the request message carries at least one parameter, and does not carry the parameter index.

S402: The first terminal device sends a first request message to a network device, and the network device receives the first request message from the first terminal device.

For example, the first request message is used to request the network device to reconfigure the SL RB, and the first request message carries the actual QoS performance and the parameter index, or carries the actual QoS performance, the SL RB identifier, the address of the first terminal device, and the address of the second terminal device, or carries the actual QoS performance, the SL RB identifier, and connection identification information, or carries the actual QoS performance and the SL RB identifier. The parameter index is an index of the at least one parameter associated with the SL RB, the first SL RB radio resource configuration information is preconfigured for the SL RB, and the first SL RB radio resource configuration information includes the SL RB identifier and the protocol layer configuration information.

S403: The network device sends a first response message to the first terminal device, and the first terminal device receives the first response message from the network device.

Specifically, the first response message includes modification status indication information, the parameter index, and second SL RB radio resource configuration information, and the modification status indication information indicates that the network device allows reconfiguration of the SL RB.

S404: The first terminal device reconfigures the SL RB.

In a possible implementation, the first response message further includes notification status indication information, and the notification status indication information indicates whether the second SL RB radio resource configuration information is notified by the network device to the second terminal device or whether the second SL RB radio resource configuration information is notified by the first terminal device to the second terminal device. The modification status indication information may be indicated in an explicit or implicit manner. For example, the modification status indication information is indicated by using a bit, and different values of the bit indicate whether the second SL RB radio resource configuration information is notified to the second terminal device. For another example, whether the second SL RB radio resource configuration information is notified to the second terminal device is indicated in a manner of whether the first response message carries the modification status indication information.

In a possible implementation, when the notification status indication information indicates that the second SL RB radio resource configuration information is not notified by the network device to the second terminal device, the method further includes:

The first terminal device sends a second request message to the second terminal device. The second request message includes one or more of the following: the address of the first terminal device, the address of the second terminal device, and the second SL RB radio resource configuration information.

In a possible implementation, the first response message further includes second timing duration, and the first terminal device updates current first timing duration based on the second timing duration. When the first terminal device receives V2X service data on the SL RB within the second timing duration, the first terminal device sends, to the network device, a request message used to release a resource and a configuration that correspond to the SL RB, where the request message carries one or more of the parameter index, the address of the first terminal device, the address of the second terminal device, the identification information of the unicast connection, and the SL RB identifier; and sends, to the second terminal device, a request message used to release the resource and the configuration that correspond to the SL RB, where the request message carries one or more of the parameter index, the address of the first terminal device, the address of the second terminal device, and the SL RB identifier.

Based on the description in FIG. 4, when the actual QoS performance of the SL RB does not meet the QoS requirement parameter, the terminal device requests, based on the actual QoS performance, to reconfigure the SL RB, thereby dynamically configuring quality of service of the SL RB based on current transmission quality, and improving flexibility of service data transmission on the SL RB.

The foregoing describes the methods in the embodiments of the present invention in detail. The following provides a schematic structural diagram of an apparatus, which is referred to as an apparatus 5 for short below, according to an embodiment of the present invention. The apparatus 5 includes a processing unit 501 and a transceiver unit 502. The apparatus 5 is configured to perform a behavior function of the terminal device or the network device in the foregoing method embodiments in FIG. 2 to FIG. 4. The processing unit 501 is configured to perform a related operation inside the apparatus, and the transceiver unit 502 is configured to receive or send data.

Embodiment a: The transceiver unit 502 is configured to send a first request message to a network device. The first request message is used to request to establish a sidelink radio bearer SL RB between a first terminal device and a second terminal device, the first request message includes a parameter index and/or at least one parameter, the at least one parameter includes one or more of a QoS requirement parameter, an address of the first terminal device, identification information of a unicast connection, an address of the second terminal device, a communications type, and a logical channel identifier, and the parameter index is an index of the at least one parameter.

The transceiver unit 502 is further configured to receive a first response message from the network device. The first response message includes one or more of admission control indication information, the at least one parameter, the parameter index, and first SL RB radio resource configuration information, the admission control indication information indicates that the network device allows establishment of the SL RB, and the first SL RB radio resource configuration information includes an SL RB identifier and/or protocol layer configuration information.

In a possible implementation, the apparatus 5 further includes the processing unit 501.

The processing unit 501 is configured to establish the SL RB based on the first SL RB radio resource configuration information.

In a possible implementation, the QoS requirement parameter includes one or more of a PC5 QFI, a PQI, a VQI, a 5QI, an ARP, a GFBR, an MFBR, and a range.

In a possible implementation, the first response message further includes notification status indication information, and the notification status indication information indicates whether the first SL RB radio resource configuration information is notified by the network device to the second terminal device or whether the first SL RB radio resource configuration information is notified by the first terminal device to the second terminal device.

In a possible implementation, the transceiver unit 502 is further configured to:

send a second request message to the second terminal device when the notification status indication information in the first response message indicates that the first SL RB radio resource configuration information is not notified by the network device to the second terminal device, where the second request message is used to request to establish the SL RB, and the second request message includes one or more of the address of the first terminal device, the address of the second terminal device, the first SL RB radio resource configuration information, and the at least one parameter; and receive a second response message from the second terminal device, where the second response message indicates that the second terminal device successfully establishes the SL RB.

In a possible implementation, the first response message further includes first timing duration.

The processing unit 501 is further configured to: when no V2X service data is received on the SL RB within the first timing duration, release a resource and a configuration that correspond to the SL RB.

The transceiver unit 502 is further configured to send a third request message to the network device. The third request message is used to indicate the network device to release the configuration and the resource that correspond to the SL RB. The third request message includes the parameter index; or includes the SL RB identifier, the address of the first terminal device, and the address of the second terminal device; or includes the SL RB identifier and the identification information of the unicast connection; or includes the SL RB identifier.

The transceiver unit 502 sends a fourth request message to the second terminal device. The fourth request message is used to indicate the second terminal device to release the configuration and the resource that correspond to the SL RB. The fourth request message includes the address of the first terminal device, the address of the second terminal device, and the SL RB identifier; or includes the SL RB identifier.

In a possible implementation, the transceiver unit 502 is further configured to receive a fifth request message from the network device. The fifth request message is used to request to reconfigure the SL RB, and the fifth request message includes one or more of the address of the first terminal device, the address of the second terminal device, the identification information of the unicast connection, the parameter index, and second SL RB radio resource configuration information.

The processing unit 501 is further configured to reconfigure the SL RB based on the second SL RB configuration.

In a possible implementation, the fifth request message further includes the notification status indication information, and the notification status indication information indicates whether the second SL RB radio resource configuration information is notified by the network device to the second terminal device.

In a possible implementation, the notification status indication information in the fifth request message indicates that the second SL RB radio resource configuration information is not notified by the network device to the second terminal device.

The transceiver unit 502 is further configured to send a sixth request message to the second terminal device. The sixth request message is used to request the second terminal device to reconfigure the SL RB, and the sixth request message includes one or more of the address of the first terminal device, the address of the second terminal device, the parameter index, the at least one parameter, and the second SL RB radio resource configuration information.

In a possible implementation, the sixth request message further includes second timing duration, and the first terminal device updates the first timing duration based on the second timing duration.

In a possible implementation, the transceiver unit 502 is further configured to receive a seventh request message from the network device. The seventh request message is used to request to release the resource and the configuration that correspond to the SL RB. The seventh request message includes the parameter index; or includes the SL RB identifier, the address of the first terminal device, and the address of the second terminal device; or includes the SL RB identifier and connection identification information; or includes the SL RB identifier. The processing unit 501 is further configured to release the resource and the configuration that correspond to the SL RB.

In a possible implementation, the transceiver unit 502 is further configured to send a seventh response message to the network device. The seventh response message indicates that the first terminal device successfully releases the resource and the configuration that correspond to the SL RB.

In a possible implementation, the seventh request message further includes release status indication information, and the release status indication information indicates whether the network device indicates the second terminal device to release the resource and the configuration that correspond to the SL RB.

In a possible implementation, the release status indication information indicates that the network device does not indicate the second terminal device to release the resource and the configuration that correspond to the SL RB.

The transceiver unit 502 is further configured to send an eighth request message to the second terminal device. The eighth request information is used to request to release the resource and the configuration of the SL RB. The eighth request message includes the address of the first terminal device, the address of the second terminal device, and the SL RB identifier; or includes the SL RB identifier.

Embodiment b: The transceiver unit 502 is configured to receive a first request message from a first terminal device. The first request message is used to request to establish a sidelink radio bearer SL RB between a first terminal device and a second terminal device, the first request message includes a parameter index and/or at least one parameter, the at least one parameter includes one or more of a QoS requirement parameter, an address of the first terminal device, identification information of a unicast connection, an address of the second terminal device, a communications type, and a logical channel identifier, and the parameter index is an index of the at least one parameter.

The transceiver unit 502 is further configured to send a first response message to the first terminal device. The first response message includes one or more of admission control indication information, the parameter index, the at least one parameter, and first SL RB radio resource configuration information, the admission control indication information indicates that the network device allows establishment of the SL RB, and the first SL RB radio resource configuration information includes an SL RB identifier and/or protocol layer configuration information.

In a possible implementation, the first response message further includes notification status indication information, and the notification status indication information indicates whether the first SL RB radio resource configuration information is notified by the network device to the second terminal device.

In a possible implementation, when the notification status indication information indicates that the first SL RB radio resource configuration information is notified by the network device to the second terminal device, the transceiver unit 502 is further configured to:

when the second terminal device is located within coverage of the network device, send a ninth request message to the second terminal device, where the ninth request message is used to request the second terminal device to establish the SL RB, and the ninth request message includes one or more of the address of the first terminal device, the address of the second terminal device, the first SL RB radio resource configuration information, and the at least one parameter; and receive a ninth response message from the second terminal device, where the ninth response message indicates that the second terminal device successfully establishes the SL RB.

In a possible implementation, the transceiver unit is further configured to:
send a fifth request message to the first terminal device. The fifth request message is used to reconfigure the SL RB, and the fifth request message includes the parameter index and second SL RB radio resource configuration information.

In a possible implementation, the fifth request message further includes the notification status indication information, and the notification status indication information indicates whether the second SL RB radio resource configuration information is notified by the network device to the second terminal device.

In a possible implementation, the notification status indication information in the fifth request message indicates that the second SL RB radio resource configuration information is notified by the network device to the second terminal device.

The transceiver unit is further configured to:
send a tenth request message to the second terminal device. The tenth request message includes the at least one parameter and/or the second SL RB radio resource configuration information.

In a possible implementation, the fifth request message further includes second timing duration, and the second timing duration is used by the first terminal to update currently configured first timing duration.

In a possible implementation, the transceiver unit 502 is further configured to:
send a seventh request message to the first terminal device. The seventh request message is used to request to release a resource and a configuration that correspond to the SL RB. The seventh request message includes the parameter index; or includes the address of the first terminal device, the address of the second terminal device, and the SL RB identifier; or includes the identification information of the unicast connection and the SL RB identifier; or includes the SL RB identifier.

In a possible implementation, the transceiver unit 502 is further configured to:
receive a seventh response message from the first terminal device. The seventh response message indicates that the first terminal device successfully releases the resource and the configuration that correspond to the SL RB.

In a possible implementation, the seventh request message further includes release status indication information, and the release status indication information indicates whether the network device indicates the second terminal device to release the resource and the configuration that correspond to the SL RB.

In a possible implementation, the release status indication information in the seventh request message indicates that the network device indicates the second terminal device to release the resource and the configuration that correspond to the SL RB.

The transceiver unit 502 is further configured to send an eleventh request message to the second terminal device. The eleventh request message is used to request to release the resource and the configuration that correspond to the SL RB, and the eleventh request message includes one or more of the following: the address of the first terminal device, the address of the second terminal device, and the SL RB identifier.

Embodiment c: The transceiver unit 502 is configured to: when the processing unit determines that actual QoS performance of an SL RB does not meet a QoS requirement parameter, send a first request message to a network device. The first request message is used to request to release a resource and a configuration that correspond to the SL RB. The first request message includes a parameter index; or includes an SL RB identifier, an address of a first terminal device, and an address of a second terminal device; or includes an SL RB identifier and connection identification information; or includes an SL RB identifier. The parameter index is an index of at least one parameter associated with the SL RB, and the at least one parameter includes one or more of the QOS requirement parameter, the address of the first terminal device, identification information of a unicast connection, the address of the second terminal device, a communications type, and a logical channel identifier.

The transceiver unit 502 is further configured to send a second request message to the second terminal device. The second request message is used to request to release the resource and the configuration that correspond to the SL RB, and the second request message includes the address of the first terminal device, the address of the second terminal device, and the SL RB identifier.

In a possible implementation, the QoS requirement parameter includes one or more of a PC5 QFI, a PQI, a VQI, a 5QI, an ARP, a GFBR, an MFBR, and a range.

Embodiment d: The transceiver unit 502 is configured to: when the processing unit determines that actual QoS performance of an SL RB does not meet a QoS requirement parameter, send a first request message to a network device. The first request message is used to request the network device to reconfigure the SL RB. The first request message carries the actual QoS performance and a parameter index; or carries the actual QoS performance, an SL RB identifier, an address of a first terminal device, and an address of a second terminal device; or carries the actual QoS performance, an SL RB identifier, and connection identification information; or carries the actual QoS performance and an SL RB identifier. The parameter index is an index of at least one parameter associated with the SL RB, first SL RB radio resource configuration information is preconfigured for the SL RB, and the first SL RB radio resource configuration information includes the SL RB identifier and protocol layer configuration information.

The transceiver unit 502 is further configured to receive a first response message from the network device. The first response message includes acceptance status indication information, the parameter index, the at least one parameter, and second SL RB radio resource configuration information, and the modification status indication information indicates that the network device allows reconfiguration of the SL RB.

The processing unit 501 is further configured to reconfigure the SL RB based on the second SL RB radio resource configuration information.

In a possible implementation, the first response message further includes notification status indication information, and the notification status indication information indicates whether the second SL RB radio resource configuration information is notified by the network device to the second terminal device.

In a possible implementation, when the notification status indication information indicates that the second SL RB radio resource configuration information is not notified by the network device to the second terminal device, the transceiver unit is further configured to:

send a second request message to the second terminal device. The second request message includes one or more of the address of the first terminal device, the address of the second terminal device, the at least one parameter, and the second SL RB radio resource configuration information.

In a possible implementation, the first response message further includes second timing duration, and the first terminal device updates current first timing duration based on the second timing duration.

Embodiment e: The transceiver unit 502 is configured to receive a first request message from a first terminal device. The first request message is used to request the network device to reconfigure an SL RB. The first request message carries actual QoS performance and a parameter index; or carries actual QoS performance, an SL RB identifier, an address of the first terminal device, and an address of a second terminal device; or carries actual QoS performance, an SL RB identifier, and connection identification information; or carries actual QoS performance and an SL RB identifier. The parameter index is an index of at least one parameter associated with the SL RB, first SL RB radio resource configuration information is preconfigured for the SL RB, and the first SL RB radio resource configuration information includes the SL RB identifier and protocol layer configuration information.

The transceiver unit 502 is further configured to send a first response message to the first terminal device. The first response message includes modification status indication information, the parameter index, and second SL RB radio resource configuration information, and the modification status indication information indicates that the network device allows reconfiguration of the SL RB.

In a possible implementation, the first response message further includes notification status indication information, and the notification status indication information indicates whether the second SL RB radio resource configuration information is notified by the network device to the second terminal device.

In a possible implementation, the notification status indication information indicates that the second SL RB radio resource configuration information is notified by the network device to the second terminal device.

The transceiver unit 502 is further configured to:

send a third request message to the second terminal device, where the third request message is used to request the second terminal device to reconfigure the SL RB, and the second request message includes one or more of the address of the first terminal device, the address of the second terminal device, the at least one parameter, and the second SL RB radio resource configuration information; and receive a second response message from the second terminal device.

In a possible implementation, the first response message further includes second timing duration, and the second timing duration is used by the first terminal device to reconfigure current first timing duration.

Alternatively, the apparatus 5 may be a field-programmable gate array (field-programmable gate array, FPGA), an application-specific integrated chip, a system on chip (system on chip, SoC), a central processing unit (central processing unit, CPU), a network processor (network processor, NP), a digital signal processing circuit, or a microcontroller unit (micro controller unit, MCU) that implements a related function, or may be a programmable controller (programmable logic device, PLD) or another integrated chip.

This embodiment of the present invention and the method embodiments in FIG. 2 to FIG. 4 are based on a same concept, the technical effects brought by this embodiment of the present invention and the method embodiments in FIG. 2 to FIG. 4 are also the same. For a specific process, refer to the descriptions in the method embodiments in FIG. 2 to FIG. 4. Details are not described herein again.

Figure 6:
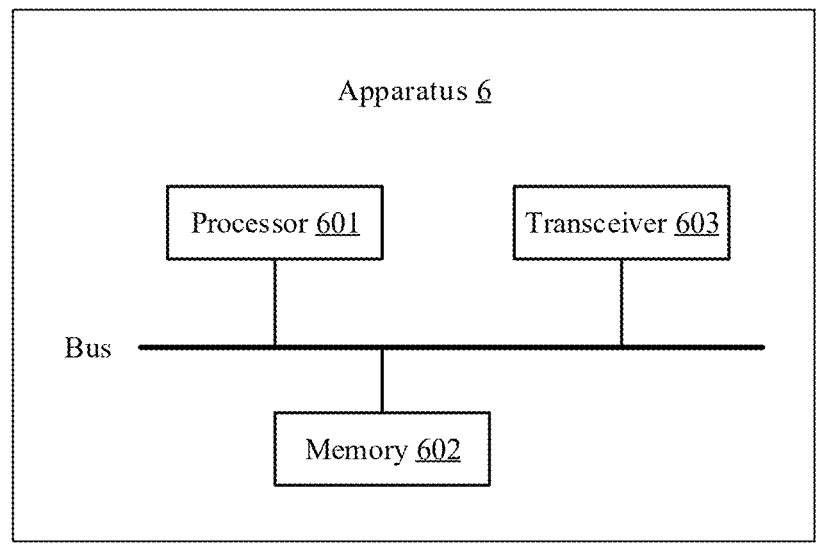
FIG. 6 is another schematic structural diagram of an apparatus according to an embodiment of the present invention.

FIG. 6 is a schematic structural diagram of an apparatus, which is referred to as an apparatus 6 for short below, according to an embodiment of the present invention. The apparatus 6 may be integrated into the foregoing network device or terminal device. As shown in FIG. 6, the apparatus includes a memory 602, a processor 601, and a transceiver 603.

The memory 602 may be an independent physical unit, and may be connected to the processor 601 and the transceiver 603 by using a bus. The memory 602, the processor 601, and the transceiver 603 may alternatively be integrated together, and implemented by using hardware, or the like.

The memory 602 is configured to store a program for implementing the foregoing method embodiments or each module in the apparatus embodiments. The processor 601 invokes the program to perform an operation of the foregoing method embodiments.

Optionally, when some or all of the sidelink communication methods in the foregoing embodiments are implemented by using software, the apparatus may alternatively include only the processor. The memory configured to store the program is located outside the apparatus. The processor is connected to the memory by using a circuit/wire, and is configured to read and execute the program stored in the memory.

The processor may be a central processing unit (central processing unit, CPU), a network processor (network processor, NP), or a combination of a CPU and an NP.

The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory may include a volatile memory (volatile memory), for example, a random-access memory (random-access memory, RAM). The memory may also include a nonvolatile memory (non-volatile memory), for example, a flash memory (flash memory), a hard disk drive (hard disk drive, HDD), or a solid-state drive (solid-state drive, SSD). The memory may further include a combination of the foregoing types of memories.

In the foregoing embodiments, a sending module or a transmitter performs a sending step in the foregoing method embodiments, a receiving module or a receiver performs a receiving step in the foregoing method embodiments, and another step is performed by another module or a processor. The sending module and the receiving module may form a transceiver module, and the receiver and the transmitter may form a transceiver.

An embodiment of this application further provides a computer storage medium storing a computer program, and the computer program is used to perform the sidelink communications methods provided in the foregoing embodiments.

An embodiment of this application further provides a computer program product including an instruction. When the computer program product runs on a computer, the computer is enabled to perform the sidelink communications methods provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A sidelink communications method applied for a first terminal device or a chip for a first terminal device, comprising:
sending a first request message to a network device, wherein the first request message is used to request to establish a sidelink radio bearer (SL RB) between the first terminal device and a second terminal device, the first request message comprises a parameter index and a first parameter, the first parameter comprises an address of the second terminal device and a communications type, and the parameter index is associated with the first parameter;
receiving a first response message from the network device, wherein the first response message comprises the parameter index and first SL RB radio resource configuration information, the first SL RB radio resource configuration information comprises protocol layer configuration information;
establishing the SL RB based on the first SL RB radio resource configuration information;
sending a second request message to the second terminal device, wherein the second request message is used to request to establish the SL RB, and the second request message comprises the first SL RB radio resource configuration information; and
receiving a second response message from the second terminal device, wherein the second response message indicates that the second terminal device successfully establishes the SL RB.

2. The method according to claim 1, further comprising:
receiving a fifth request message from the network device, wherein the fifth request message is used to request to reconfigure the SL RB, and the fifth request message comprises the parameter index and second SL RB radio resource configuration information; and
reconfiguring the SL RB based on the second SL RB configuration.

3. The method according to claim 2, wherein the method further comprises:
sending a sixth request message to the second terminal device, wherein the sixth request message is used to request the second terminal device to reconfigure the SL RB, and the sixth request message comprises the second SL RB radio resource configuration information.

4. The method according to claim 1, wherein the first parameter further comprises a QoS requirement parameter.

5. The method according to claim 1, wherein the protocol layer configuration information comprises packet data convergence protocol (PDCP) layer configuration information.

6. A sidelink communications method applied for a network device or a chip for a network device, comprising:
receiving a first request message from a first terminal device, wherein the first request message is used to request to establish a sidelink radio bearer (SL RB) between the first terminal device and a second terminal device, the first request message comprises a parameter index and a first parameter, the first parameter comprises an address of the second terminal device and a communications type, and the parameter index is associated with the first parameter;
sending a first response message to the first terminal device, wherein the first response message comprises the parameter index and first SL RB radio resource configuration information, the first SL RB radio resource configuration information comprises protocol layer configuration information, and the first SL RB radio resource configuration information is used for establishing the SL RB; and
sending a fifth request message to the first terminal device, wherein the fifth request message is used to reconfigure the SL RB, and the fifth request message comprises the parameter index and second SL RB radio resource configuration information.

7. The method according to claim 6, wherein the first parameter further comprises a QoS requirement parameter.

8. The method according to claim 6, wherein the protocol layer configuration information comprises packet data convergence protocol (PDCP) layer configuration information.

9. An apparatus, comprising:
at least one processor, and a memory storing instructions for execution by the at least one processor;
wherein, when executed, the instructions cause the apparatus to perform operations comprising:
sending a first request message to a network device, wherein the first request message is used to request to establish a sidelink radio bearer (SL RB) between the apparatus and a second terminal device, the first request message comprises a parameter index and a first parameter, the first parameter comprises an address of the second terminal device, a communications type and the parameter index is associated with the first parameter;
receiving a first response message from the network device, wherein the first response message comprises the parameter index and first SL RB radio resource configuration information, and the first SL RB radio resource configuration information comprises protocol layer configuration information;
establishing the SL RB based on the first SL RB radio resource configuration information;
sending a second request message to the second terminal device, wherein the second request message is used to request to establish the SL RB, and the second request message comprises the first SL RB radio resource configuration information; and
receiving a second response message from the second terminal device, wherein the second response message indicates that the second terminal device successfully establishes the SL RB.

10. The apparatus according to claim 9, wherein the operations further comprises:
receiving a fifth request message from the network device, wherein the fifth request message is used to request to reconfigure the SL RB, and the fifth request message comprises the parameter index and second SL RB radio resource configuration information; and
reconfiguring the SL RB based on the second SL RB configuration.

11. The apparatus according to claim 10, wherein the operations further comprises:
sending a sixth request message to the second terminal device, wherein the sixth request message is used to request the second terminal device to reconfigure the SL RB, and the sixth request message comprises the second SL RB radio resource configuration information.

12. The apparatus according to claim 9, wherein the first parameter further comprises a QoS requirement parameter.

13. The apparatus according to claim 9, wherein the protocol layer configuration information comprises packet data convergence protocol (PDCP) layer configuration information.

14. An apparatus, comprising:
at least one processor, and a memory storing instructions for execution by the at least one processor;
wherein, when executed, the instructions cause the apparatus to perform operations comprising:
receiving a first request message from a first terminal device, wherein the first request message is used to request to establish a sidelink radio bearer (SL RB) between the first terminal device and a second terminal device, the first request message comprises a parameter index and a first parameter, the first parameter comprises an address of the second terminal device and a communications type, and the parameter index is associated with the first parameter;
sending a first response message to the first terminal device, wherein the first response message comprises the parameter index and first SL RB radio resource configuration information, the first SL RB radio resource configuration information comprises protocol layer configuration information, and the first SL RB radio resource configuration information is used for establishing the SL RB; and
sending a fifth request message to the first terminal device, wherein the fifth request message is used to reconfigure the SL RB, and the fifth request message comprises the parameter index and second SL RB radio resource configuration information.

15. The apparatus according to claim 14, wherein the first parameter further comprises a QoS requirement parameter.

16. The apparatus according to claim 14, wherein the protocol layer configuration information comprises packet data convergence protocol (PDCP) layer configuration information.

* * * * *